United States Patent
Wipf

Patent Number: 5,423,409
Date of Patent: Jun. 13, 1995

[54] APPARATUS FOR FORMING A PLURALITY OF ARTICLE ROWS FROM A SINGLE ARTICLE ROW

[75] Inventor: Alfred Wipf, Jestetten, Germany

[73] Assignee: SIG Schweizerische Industrie-Gesellschaft, Neuhausen am Rheinfall, Switzerland

[21] Appl. No.: 222,032

[22] Filed: Apr. 4, 1994

[30] Foreign Application Priority Data

Apr. 5, 1993 [CH] Switzerland ............. 01035/93

[51] Int. Cl.⁶ ............................. B65G 47/46
[52] U.S. Cl. .............. 198/367; 198/370.09; 198/437; 198/442
[58] Field of Search ........... 198/367, 437, 442, 445, 198/419.2, 456, 372

[56] References Cited

U.S. PATENT DOCUMENTS

| | | |
|---|---|---|
| 3,232,417 | 2/1966 | Muller .................. 198/367 |
| 3,429,417 | 2/1969 | DeGood et al. ........ 198/367 |
| 4,633,996 | 1/1987 | Waterhouse ........... 198/372 |
| 5,042,636 | 8/1991 | Underwood ............ 198/372 |

FOREIGN PATENT DOCUMENTS 9003468 6/1990 Germany .

*Primary Examiner*—D. Glenn Dayoan
*Attorney, Agent, or Firm*—Spencer, Frank & Schneider

[57] ABSTRACT

An apparatus for forming a plurality of output rows from a single input row of articles has a conveyor advancing articles in a row parallel to the conveying direction; a deflecting device including an endless deflecting belt trained about two end rollers and having, when in a working position, an operative length portion forming an acute angle with the conveying direction. The deflecting member includes a first length portion provided with a bounding edge extending generally parallel to the conveyor surface and being at a clearance therefrom which is less than an expected minimum height of the articles positioned on the conveyor. The deflecting member further has a second length portion provided with a bounding edge extending generally parallel to the conveyor surface and being at a clearance therefrom which is greater than an expected maximum height of the articles positioned on the conveyor. A control device for the deflecting belt drive selectively moves the deflecting belt to place the first length portion or the second length portion into the working position. Thus, the first length portion, when assuming the working position, deflects the articles on the conveyor to form a first output row of articles thereon offset relative to the input row and the second length portion, when assuming the working position, allows the articles of the input row to pass undeflected under the deflecting member to form a second output row of articles on the conveyor.

15 Claims, 2 Drawing Sheets

APPARATUS FOR FORMING A PLURALITY OF ARTICLE ROWS FROM A SINGLE ARTICLE ROW

CROSS REFERENCE TO RELATED APPLICATION

This application claims the priority of Swiss Application No. 1035/93-8 filed Apr. 5, 1993, which is incorporated herein by reference.

BACKGROUND OF THE INVENTION

This invention relates to a conveyor apparatus which forms a plurality of rows of advancing flat articles such as confectionery items, from a single incoming article row.

British Patent No. 1,594,810 discloses an apparatus which divides a single incoming row of bottles into a plurality of outgoing rows. The rows are formed on a plurality of conveyor belts between guide rails extending in the transporting direction. For deflecting a bottle series into a second row, an inclined first deflecting pusher is moved to a second deflecting pusher so that the bottles are deflected into a second row along the two pushers. If again the first row is to be supplied with bottles, both pushers are retracted and thereafter the second pusher is advanced so that the subsequent bottle, passing the second pusher, moves into the first row. Upon such an operation two bottles at the downstream end of the second pusher are not guided which may lead to crowding and operational disturbances. It is a further disadvantage of this known apparatus that its output rate is relatively low.

SUMMARY OF THE INVENTION

It is an object of the invention to provide an improved apparatus for forming a plurality of advancing output rows from a single continuously advancing input row of flat-lying, disc or wafer-like products, particularly biscuits, chocolate bars or bonbons which are handled by the apparatus in a gentle manner, with a high output rate as well as with a high degree of operational safety and reliability.

This object and others to become apparent as the specification progresses, are accomplished by the invention, according to which, briefly stated, the apparatus for forming a plurality of output rows from a single input row of articles has a conveyor advancing articles in a row parallel to the conveying direction; a deflecting device including an endless deflecting member trained about two guide members and having, when in a working position, an operative length portion forming an acute angle with the conveying direction. The deflecting member includes a first length portion provided with a bounding edge extending generally parallel to the conveyor surface and being at a clearance therefrom which is less than an expected minimum height of the articles positioned on the conveyor. The deflecting member further has a second length portion provided with a bounding edge extending generally parallel to the conveyor surface and being at a clearance therefrom which is greater than an expected maximum height of the articles positioned on the conveyor. A control device for the deflecting belt drive moves the deflecting belt to selectively place the first length portion or the second length portion into the working position. Thus, the first length portion, when assuming the working position, deflects the articles on the conveyor to form a first output row of articles thereon offset relative to the input row and the second length portion, when assuming the working position, allows the articles of the input row to pass undeflected under the deflecting member to form a second output row of articles on the conveyor.

DESCRIPTION OF THE PREFERRED EMBODIMENTS

Figure 1:
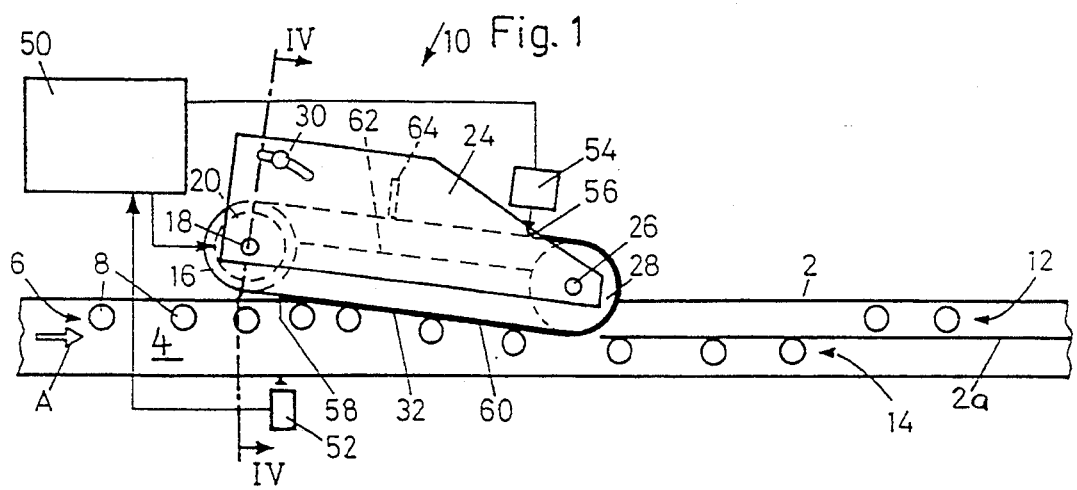
FIG. 1 is a schematic top plan view of a preferred embodiment of the invention.
Figure 2:
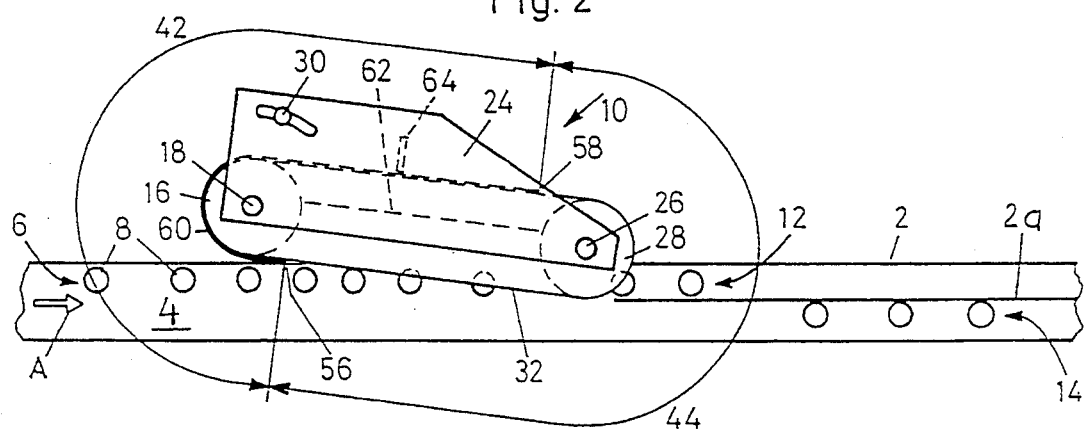
FIG. 2 is a view similar to FIG. 1, showing a component in a different operational position.

Turning to FIG. 1, the apparatus illustrated therein includes a conveyor belt 2 which has an upper horizontal run, on the upper face 4 of which an aligned incoming row 6 of articles 8 is advanced at random spacing in the conveying direction A. A deflecting device 10 splits the incoming (input) row 6 into two outgoing (output) rows 12, 14. The deflecting device 10 includes a driving end roller 16 which is situated laterally of the conveyor belt 2 and which is mounted on the drive shaft 18 of a servomotor 20. The axis 22 (FIG. 4) of the shaft 18 is vertically oriented. An arm 24 which is mounted to be pivotal about the axis 22 carries at its free end another end roller 28 which is situated partially vertically above the conveyor belt 2. The end roller 28 has a shaft 26 which is parallel to the shaft 18 and which is mounted on the pivotal arm 24. The arm 24 may be immobilized in a desired angular position by means of a securing screw 30. The pivotal adjustment of the arm 24 allows the deflecting device 10 to be used for different shapes or diameters of articles 8. The end rollers 16 and 28 support an endless article deflecting belt 32 made, for example, of polyamide. As it is apparent upon considering FIGS. 1 and 4 together, the end rollers (belt guide rollers) 16 and 28 have cylindrical surfaces having vertical axes. Further, as seen in FIGS. 1 and 2, the deflecting belt 32 has a first run situated vertically above the upper face 4 of the conveyor belt 2 and a second run situated laterally above the upper face 4.

Figure 3:
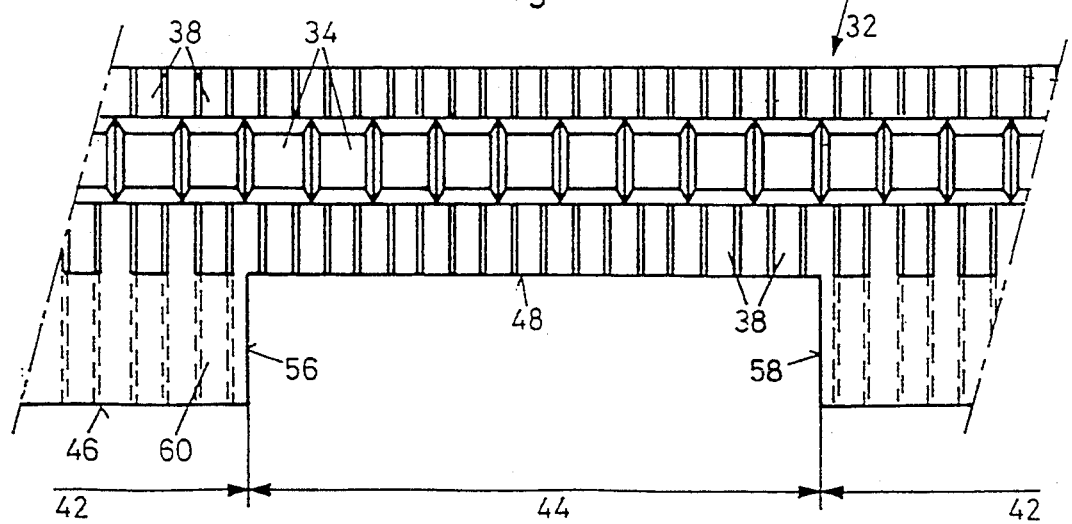
FIG. 3 is an enlarged fragmentary side elevational view of a component of the preferred embodiment.
Figure 4:
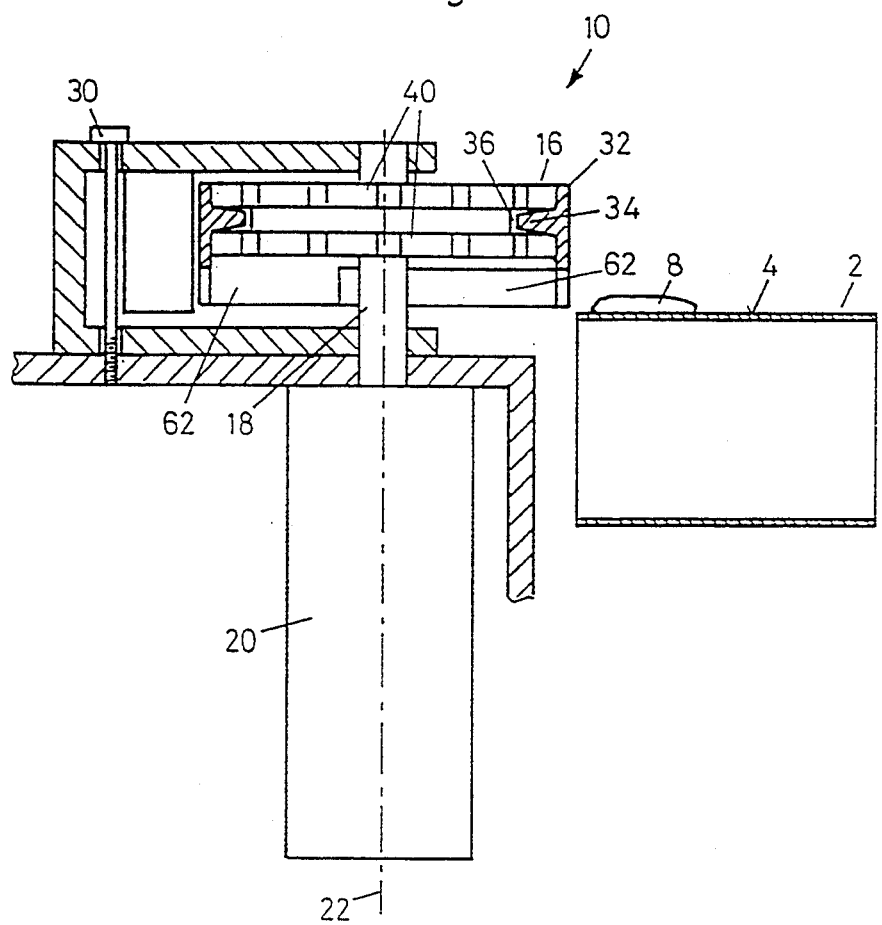
FIG. 4 is a sectional view taken along line IV—IV of FIG. 1.

Referring to FIGS. 3 and 4, the deflecting belt 32 has an inner, longitudinally extending ridge 34 which engages into circumferential grooves 36 of the end rollers 16 and 28 for laterally guiding the deflecting belt 32. On either side of the ridge 34 teeth 38 are provided which mesh with teeth 40 of the driving end roller 16. The deflecting belt 32 has a deflecting length portion 42 and a pass-through length portion 44. Along the deflecting length portion 42 the lower edge 46 of the belt 32 extends close to the upper face 4 of the conveyor belt 2. The clearance between the lower edge 46 of the deflecting belt 32 and the upper face 4 is less than the expected minimum height of the articles. For stiffening the deflecting length portion 42, the teeth 38 may be extended down to the lower edge 46 as shown in phantom lines in FIG. 3. In the pass-through length portion 44 the lower edge 48 is situated at a greater distance from the upper face 4 of the belt 2 than the edge 46 of the deflecting length portion 42. The clearance between the lower edge 48 is greater than the expected maximum height of the articles. The two length portions 42 and 44 are approximately of equal size and thus each extends approximately through one half of the length of the deflecting belt 32.

The motor 20 is controlled by a control device 50 which receives signals from two reflection-type optical barriers 52, 54. The optical barrier 52 senses, adjacent the driving end roller 16, the intermediate spaces between adjoining articles 8 in order to cause energization of the motor 20 such that the leading edge 56 or the trailing edge 58 of the deflecting length portion 42 runs in synchronism with such intermediate space to turn the deflecting belt 32 either into the deflecting position shown in FIG. 1 or into the pass-through position shown in FIG. 2. In FIGS. 1 and 2 the deflecting length portion 42 is, for better understanding, drawn thicker than the length portion 44. The optical barrier 54 senses the leading and trailing edges 56, 58 of the deflecting length portion 42 to thus stop the motor 20 in such a manner that either the trailing edge 58 (FIG. 1) or the leading edge 56 (FIG. 2) stops next to the driving end roller 16 immediately at the edge of the conveyor belt 2. The optical barrier 52 may be laterally adjustable or its signal may be transmitted with a settable delay.

In the position illustrated in FIG. 1, all items 8 of the incoming row 6 are deflected by the skirt 60 of the deflecting length portion 42 into the row 14 which is separated from the row 12 by a guide plate 2a having a vertical main plane and extending in the conveying direction A. For supporting the skirt 60 in the deflecting zone a supporting body 62 is affixed to the pivotal arm 24. The supporting body 62 may include a groove for guiding the ridge 34 therein.

In case the outgoing row 12 is to be supplied with articles (the outgoing row 12 is a linear continuation of the incoming row 6) then upon passage of a space between two adjoining articles 8 at the trailing edge 58 the motor 20 is energized so that the deflecting belt 32 runs in synchronism with the conveyor belt 2 until the deflecting belt 32 has travelled one half of its length and thus the leading edge 56 is situated at the location where previously the trailing edge 58 was located (FIG. 2). After this occurrence, all articles 8 pass underneath the belt 32 and the end roller 28 to the outgoing row 12.

Adjoining the return (idling) run of the belt 32 a stripper 64 is supported on the frame 24 for removing any article residuals from the external face of the skirt 60. This arrangement provides for a self-cleaning of the apparatus.

The control device 50 may include a counter which effects switching after a predetermined first and second number of clearances between adjoining articles 8 have been sensed by the optical barrier 52. In this manner the articles may be divided between the two rows 12 and 14 in a preselected ratio, for example, 1:1 or 2:1. When the articles arrive on the conveyor belt 2 in equal spacing then for a uniform division between the two outgoing rows 12, 14, the motor may run continuously in which case the motor is briefly braked or accelerated for synchronizing with the clearances when the leading or trailing edges 56, 58 pass through the positions illustrated in FIGS. 1 and 2.

Figure 5:
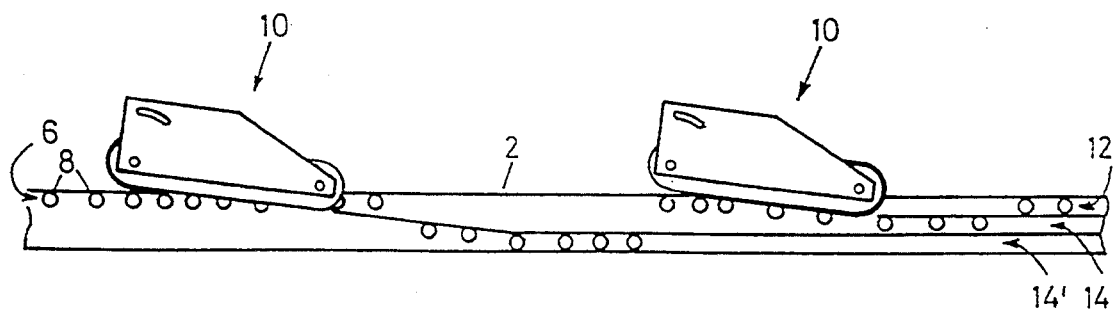
FIG. 5 is a schematic top plan view of another preferred embodiment of the invention.

The embodiment illustrated in FIG. 5 serves for dividing the single incoming row 6 to more than two outgoing rows. For this purpose a plurality of longitudinally spaced deflecting devices 10 are provided. As an alternative, it is feasible to pivotally adjust the arm by a motor drive. For this purpose at any time period when the row 12 is supplied with articles, the angle of the arm is adjusted and subsequently, with an appropriate angular adjustment of the arm 24, one of two further outgoing rows can be supplied with articles.

The above-described apparatus may operate with a very high output (for example, 300–2,000 pieces per minute). It has a high switching capacity while it treats the items in a gentle manner and unequivocally assigns each product to their respective outgoing rows. By shifting the articles through a plurality of cadence lengths (for example, 3–5) only slight lateral accelerations are necessary so that even brittle and soft, delicate items such as biscuits, chocolate products or packaged goods may be deflected without disturbances. Since for every switching, several products (for example, 3–5) are shifted together, less synchronization per minute is necessary which increases the operational safety. The construction of the device is simple, it is easily accessible and may be easily monitored.

It will be understood that the above description of the present invention is susceptible to various modifications, changes and adaptations, and the same are intended to be comprehended within the meaning and range of equivalents of the appended claims.

What is claimed is:

1. An apparatus for forming a plurality of output rows from a single input row of articles, comprising
   (a) a conveyor having an upper surface movable in a conveying direction and supporting articles thereon in a row extending parallel to said conveying direction;
   (b) a deflecting device positioned above said upper surface and including
      (1) two spaced guide members;
      (2) an endless belt which is trained about said guide members and having, when in a working position, an operative length portion forming an acute angle with said conveying direction; said acute angle pointing in said conveying direction; said belt including
         (i) a first length portion provided with a bounding edge extending generally parallel to said upper surface and being at a relatively small clearance from said upper surface; said relatively small clearance being less than an expected minimum height of the articles positioned on said upper surface; and
         (ii) a second length portion provided with a bounding edge extending generally parallel to said upper surface and being at a relatively large clearance from said upper surface; said relatively large clearance being greater than an expected maximum height of the articles positioned on said upper surface;
   (c) drive means for circulating said belt; and
   (d) control means for controlling said drive means to selectively move said belt for placing said first length portion or said second length portion into said working position; whereby said first length portion, when assuming said working position, deflects the articles on said upper surface to form a first output row of articles thereon offset relative to said input row and said second length portion, when assuming said working position, allows the articles of said input row to pass undeflected under said belt to form a second output row of articles on said upper surface.

2. The apparatus as defined in claim 1, wherein said first length portion is a sole first length portion and said second length portion is a sole second length portion; each said length portion having a length approximately equalling the length of said operative length portion.

3. The apparatus as defined in claim 1, wherein one of said guide members is a drive roller and said drive means comprises a motor drivingly connected with said drive roller.

4. The apparatus as defined in claim 1, wherein said acute angle is between 7 to 20°.

5. The apparatus as defined in claim , wherein the belt is of polyamide.

6. The apparatus as defined in claim 1, wherein said belt comprises lateral guide means situated at a distance from the bounding edges of said first and second length portions.

7. The apparatus as defined in claim 1, wherein said belt is a toothed belt having teeth; said teeth extending into said first length portion and functioning as reinforcements therefor.

8. The apparatus as defined in claim 1, wherein one of said guide members is an upstream guide member as viewed in said conveying direction; further wherein said control means comprises a sensor means situated adjacent said upstream guide member for determining a spacing between adjoining articles on said upper surface of said conveyor.

9. The apparatus as defined in claim 8, wherein said sensor means is a first sensor means; further comprising a second sensor means situated along said deflecting member for sensing a transition from said first length portion to said second length portion to stop travel of said deflecting member in a predetermined position.

10. The apparatus as defined in claim 1, further comprising a supporting member for supporting said deflecting member in a vertical and in a horizontal direction.

11. The apparatus as defined in claim 1, wherein said deflecting device is a first deflecting device; further comprising a second deflecting device structured identically to said first deflecting device and being situated downstream therefrom as viewed in said conveying direction for forming additional output rows from an output row formed by said first deflecting device.

12. The apparatus as defined in claim 1, wherein said belt has a first run situated vertically above said upper surface of said conveyor, said first run including said operative length portion, and a second run laterally spaced from said first run and located away from said upper surface.

13. An apparatus for forming a plurality of output rows from a single input row of articles, comprising
  (a) a conveyor having an upper surface movable in a conveying direction and supporting articles thereon in a row extending parallel to said conveying direction;
  (b) a deflecting device positioned above said upper surface and including
    (1) two spaced guide members;
    (2) an endless deflecting member trained about said guide members and having, when in a working position, an operative length portion forming an acute angle with said conveying direction; said acute angle pointing in said conveying direction; said deflecting member including
      (i) a first length portion provided with a bounding edge extending generally parallel to said upper surface and being at a relatively small clearance from said upper surface; said relatively small clearance being less than an expected minimum height of the articles positioned on said upper surface; and
      (ii) a second length portion provided with a bounding edge extending generally parallel to said upper surface and being at a relatively large clearance from said upper surface; said relatively large clearance being greater than an expected maximum height of the articles positioned on said upper surface;
  (c) drive means for circulating said deflecting member;
  (d) control means for controlling said drive means to selectively move said deflecting belt for placing said first length portion or said second length portion into said working position; whereby said first length portion, when assuming said working position, deflects the articles on said upper surface to form a first output row of articles thereon offset relative to said input row and said second length portion, when assuming said working position, allows the articles of said input row to pass undeflected under said deflecting member to form a second output row of articles on said upper surface;
  (e) an arm supporting said guide members; and
  (f) means for angularly adjusting said arm for setting said acute angle.

14. An apparatus for forming a plurality of output rows from a single input row of articles, comprising
  (a) a conveyor having an upper surface movable in a conveying direction and supporting articles thereon in a row extending parallel to said conveying direction;
  (b) a deflecting device positioned above said upper surface and including
    (1) two spaced guide members comprising cylindrical surfaces having substantially vertical axes;
    (2) an endless belt which is trained about said guide members and having, when in a working position, an operative length portion forming an acute angle with said conveying direction; said acute angle pointing in said conveying direction; said belt including
      (i) a first length portion provided with a bounding edge extending generally parallel to said upper surface and being at a relatively small clearance from said upper surface; said relatively small clearance being less than an expected minimum height of the articles positioned on said upper surface; and
      (ii) a second length portion provided with a bounding edge extending generally parallel to said upper surface and being at a relatively large clearance from said upper surface; said relatively large clearance being greater than an expected maximum height of the articles positioned on said upper surface;
  (c) drive means for circulating said belt; and
  (d) control means for controlling said drive means to selectively move said belt for placing said first length portion or said second length portion into said working position; whereby said first length portion, when assuming said working position, deflects the articles on said upper surface to form a first output row of articles thereon offset relative to said input row and said second length portion, when assuming said working position, allows the articles of said input row to pass undeflected under said belt to form a second output row of articles on said upper surface. The apparatus as defined in claim 1, wherein the guide members comprise cylindrical surfaces having substantially vertical axes.

15. The apparatus as defined in claim 14, wherein said guide members comprise guide rollers and further wherein said cylindrical surfaces constitute peripheries of said guide rollers.

* * * * *